United States Patent
Xu et al.

(10) Patent No.: US 11,265,080 B2
(45) Date of Patent: Mar. 1, 2022

(54) SUBMARINE CABLE FAULT DETERMINING METHOD AND APPARATUS

(71) Applicant: HUAWEI MARINE NETWORKS CO., LTD., Tianjin (CN)

(72) Inventors: Changwu Xu, Shenzhen (CN); Keqiang Cui, Shenzhen (CN); Guangjun Wang, Shenzhen (CN); Yingli Tao, Shenzhen (CN); Li Yang, Shenzhen (CN); Jianping Li, Shenzhen (CN)

(73) Assignee: HMN Technologies Co., Limited, Tianjin (CN)

( * ) Notice: Subject to any disclaimer, the term of this patent is extended or adjusted under 35 U.S.C. 154(b) by 0 days.

(21) Appl. No.: 17/051,664

(22) PCT Filed: Apr. 29, 2019

(86) PCT No.: PCT/CN2019/085072
§ 371 (c)(1),
(2) Date: Oct. 29, 2020

(87) PCT Pub. No.: WO2020/220231
PCT Pub. Date: Nov. 5, 2020

(65) Prior Publication Data
US 2021/0218469 A1 Jul. 15, 2021

(51) Int. Cl.
*H04B 10/077* (2013.01)
*H04L 12/26* (2006.01)
*H04L 43/10* (2022.01)

(52) U.S. Cl.
CPC ......... *H04B 10/0771* (2013.01); *H04L 43/10* (2013.01)

(58) Field of Classification Search
None
See application file for complete search history.

(56) References Cited

U.S. PATENT DOCUMENTS

| 7,103,275 B2 | 9/2006 | Fujiwara |
| 10,666,354 B2 | 5/2020 | Satou |

(Continued)

FOREIGN PATENT DOCUMENTS

| CN | 1842076 A | 10/2006 |
| CN | 101707536 A * | 5/2010 |

(Continued)

OTHER PUBLICATIONS

International Search Report regarding Application No. PCT/CN2019/085072 dated Feb. 3, 2020.

*Primary Examiner* — Darren E Wolf
(74) *Attorney, Agent, or Firm* — Harness, Dickey & Pierce, P.L.C.

(57) ABSTRACT

This application discloses a submarine cable fault determining method and apparatus for realizing detecting whether a fault occurs to a submarine cable, without depending on TTE. The submarine cable fault determining method includes: receiving, by a network management system, first detection information from a first device during a first preset time, and receiving second detection information from a second device during a second preset time, where the second detection information is used to indicate whether the second device receives a first heartbeat signal from the first device through a submarine cable, and the first detection information is used to indicate whether the first device receives a second heartbeat signal from the second device through the submarine cable; and determining, by the network management system based on the first detection information and the second detection information, whether a fault occurs to the submarine cable between the first device and the second device.

21 Claims, 4 Drawing Sheets

(56) References Cited

U.S. PATENT DOCUMENTS

| | | | |
|---|---|---|---|
| 2003/0011855 A1 | 1/2003 | Fujiwara | |
| 2003/0072062 A1* | 4/2003 | Pedersen | H04B 10/2916 398/181 |
| 2003/0113118 A1* | 6/2003 | Bartur | H04B 10/40 398/139 |
| 2003/0152390 A1* | 8/2003 | Stewart | H04B 10/40 398/135 |
| 2004/0028406 A1* | 2/2004 | Bortz | H04Q 11/0005 398/49 |
| 2004/0047635 A1* | 3/2004 | Aronson | H04B 10/40 398/138 |
| 2006/0077988 A1* | 4/2006 | Cheng | H04L 29/12009 370/401 |
| 2009/0182878 A1* | 7/2009 | Streijl | H04L 41/0896 709/226 |
| 2011/0252337 A1* | 10/2011 | Pignataro | H04L 41/0266 715/748 |
| 2011/0311216 A1* | 12/2011 | Inoue | H04J 14/0213 398/1 |
| 2017/0118067 A1* | 4/2017 | Vedula | H04L 61/103 |
| 2019/0104203 A1 | 4/2019 | Bute et al. | |
| 2019/0253139 A1 | 8/2019 | Satou | |

FOREIGN PATENT DOCUMENTS

| | | |
|---|---|---|
| CN | 105553760 A | 5/2016 |
| CN | 106301853 A | 1/2017 |
| CN | 106850271 A | 6/2017 |
| CN | 109218141 A | 1/2019 |
| CN | 109792294 A | 5/2019 |
| JP | 2002033703 A | 1/2002 |
| JP | 2003032192 A | 1/2003 |
| JP | 2003124897 A | 4/2003 |
| WO | WO-2018051935 A1 | 3/2018 |

* cited by examiner

SUBMARINE CABLE FAULT DETERMINING METHOD AND APPARATUS

CROSS REFERENCE TO RELATED APPLICATIONS

This application is a U.S. National Phase Application under 35 U.S.C. 371 of International Application No. PCT/CN2019/085072 filed on Apr. 29, 2019. The entire disclosure of the above application is incorporated herein by reference.

FIELD OF THE INVENTION

This application relates to the field of submarine cable communication, and in particular, to a submarine cable fault determining method and apparatus.

BACKGROUND OF THE INVENTION

Development trend of the submarine cable communication system is gradually opening the cable, to realize decoupling the submarine cable communication system and a terminal transmission equipment (TTE). In other words, a same submarine cable communication system may purchase TTEs of different manufacturers.

FIG. 1 shows a schematic architectural diagram of an open cable communication system, including a land terminal device 100, an undersea device 200, a network management system (NMS) 300, and a TTE NMS 400. The land terminal device 100 includes an open cable access equipment (OCAE) 101 and a TTE 102. The undersea device 200 includes a submarine cable, an optical amplifier, a branching unit (BU), a reconfigurable optical add-drop multiplexer (ROADM), an optical equalizer (OEQ), and other devices. The NMS 300 manages the OCAE 101 through a data communication network (DCN), and indirectly manages the undersea device 200 through the OCAE 101. The TTE 102 communicates with the OCAE 101 through an open interface. The TTE NMS 400 is responsible for managing the TTE 102. The TTE 102 may provide alarm information about a submarine cable fault, and send the alarm information to the NMS 300 by using the TTE NMS 400.

However, because the TTE 102 may come from different manufacturers, there is no unified standard about communication of the alarm information between the TTE NMS 400 and the NMS300. Therefore, it is very difficult in the prior arts to uniformly obtain alarm information about a submarine cable fault.

SUMMARY OF THE INVENTION

Embodiments of this application provide a submarine cable fault determining method and apparatus for realizing detecting whether a fault occurs to a submarine cable, without depending on TTE.

To achieve the foregoing objective, the following technical solutions are used in the embodiments of this application.

According to a first aspect, a submarine cable fault determining method is provided, including: receiving, by a network management system, first detection information from a first device during a first preset time, and receiving second detection information from a second device during a second preset time, where the second detection information is used to indicate whether the second device receives a first heartbeat signal from the first device through a submarine cable, and the first detection information is used to indicate whether the first device receives a second heartbeat signal from the second device through the submarine cable; and determining, by the network management system based on the first detection information and the second detection information, whether a fault occurs to the submarine cable between the first device and the second device. According to the submarine cable fault determining method provided in an embodiment of this application, devices communicating through a submarine cable send heartbeat signals to each other, and the network management system collects results about whether each device receives the heartbeat signal from an opposite terminal, so as to determine that a fault occurs to the submarine cable between which two devices, thus realizing detecting whether a fault occurs to the submarine cable, without depending on TTE.

In a possible implementation, the determining, by the network management system based on the first detection information and the second detection information, whether a fault occurs to the submarine cable between the first device and the second device includes that: if the first detection information indicates that the first device does not receive the second heartbeat signal from the second device through the submarine cable, the network management system determines that a fault occurs to the submarine cable in a transmission direction from the second device to the first device; and if the first detection information indicates that the first device receives the second heartbeat signal from the second device through the submarine cable, the network management system determines that no fault occurs to the submarine cable in the transmission direction from the second device to the first device.

In a possible implementation, the determining, by the network management system based on the first detection information and the second detection information, whether a fault occurs to the submarine cable between the first device and the second device includes that: if the second detection information indicates that the second device does not receive the first heartbeat signal from the first device through the submarine cable, the network management system determines that a fault occurs to the submarine cable in a transmission direction from the first device to the second device; and if the second detection information indicates that the second device receives the first heartbeat signal from the first device through the submarine cable, the network management system determines that no fault occurs to the submarine cable in the transmission direction from the first device to the second device.

In a possible implementation, before the receiving, by a network management system, first detection information from a first device during a first preset time, and receiving second detection information from a second device during a second preset time, the method further includes: detecting, by the network management system, that no fault occurs to the first device and the second device. If a fault occurs to the first device or the second device, detection information sent thereby may be inaccurate or the network management system cannot receive the corresponding detection information.

In a possible implementation, before the receiving, by a network management system, first detection information from a first device during a first preset time, the method further includes: receiving second indication information by the network management system, where the second indication information is used to indicate that the second device successfully sends the second heartbeat signal; and before the receiving second detection information from a second device during a second preset time, the method further includes: receiving first indication information by the network management system, where the first indication information is used to indicate that the first device successfully sends the first heartbeat signal. The network management system may determine, based on the foregoing indication information, that a heartbeat signal of a transmit end is normally sent.

In a possible implementation, before that the network management system determines that a fault occurs to the submarine cable in a transmission direction from the second device to the first device, the method further includes: receiving, by the network management system, third detection information from the first device during a third preset time, where the third detection information is used to indicate whether the first device receives a fourth heartbeat signal from the second device through the submarine cable. The network management system may determine, based on the detection information sent by the first device for multiple times, that a fault occurs to the submarine cable in the transmission direction from the second device to the first device.

In a possible implementation, before that the network management system determines that a fault occurs to the submarine cable in a transmission direction from the first device to the second device, the method further includes: receiving, by the network management system, fourth detection information from the second device during a fourth preset time, where the fourth detection information is used to indicate whether the second device receives a third heartbeat signal from the first device through the submarine cable. The network management system may determine, based on the detection information sent by the second device for multiple times, that a fault occurs to the submarine cable in the transmission direction from the first device to the second device.

In a possible implementation, modulation frequencies of the first heartbeat signal and the second heartbeat signal are higher than a cut-off frequency of an erbium doped fiber amplifier EDFA. In this way, the EDFA has little or no attenuation to a heartbeat signal.

In a possible implementation, modulation depths of the first heartbeat signal and the second heartbeat signal are smaller than a preset threshold. In this way, service transmission is not affected, and an optical signal to noise ratio of a system is not reduced.

In a possible implementation, carrier signals of the first heartbeat signal and the second heartbeat signal are modulated by means of total optical power. In this way, service bandwidth is not occupied.

According to a second aspect, a submarine cable fault determining method is provided, including: sending, by a first device, a first heartbeat signal to a second device through a submarine cable, where the first heartbeat signal is sued to determine whether a fault occurs to the submarine cable in a transmission direction from the first device to the second device; determining, by the first device, first detection information based on whether a second heartbeat signal from the second device is received during a first preset time through the submarine cable, where the first detection information is used to indicate whether the first device receives the second heartbeat signal from the second device through the submarine cable; and sending, by the first device, the first detection information to a network management system. According to the submarine cable fault determining method provided in an embodiment of this application, devices that communicate through a submarine cable send heartbeat signals to each other, and the network management system collects results about whether each device receives the heartbeat signal from an opposite terminal, so as to determine that a fault occurs to the submarine cable between which two devices, thus realizing detecting whether a fault occurs to the submarine cable, without depending on TTE.

In a possible implementation, the method further includes: sending, by the first device, first indication information to the network management system, where the first indication information is used to indicate that the first device successfully sends the first heartbeat signal. The network management system may determine, based on the foregoing indication information, that a heartbeat signal of a transmit end is normally sent.

In a possible implementation, the method further includes: sending, by the first device, a third heartbeat signal to the second device, where the third heartbeat signal is used to determine whether a fault occurs to the submarine cable in the transmission direction from the first device to the second device.

In a possible implementation, the method further includes: determining, by the first device, second detection information based on whether a fourth heartbeat signal from the second device is received during a second preset time through the submarine cable, where the second detection information is used to indicate whether the first device receives the fourth heartbeat signal from the second device through the submarine cable; and sending, by the first device, the second detection information to the network management system.

In a possible implementation, modulation frequencies of the first heartbeat signal and the second heartbeat signal are higher than a cut-off frequency of an erbium doped fiber amplifier EDFA. In this way, the EDFA has little or no attenuation to the heartbeat signal.

In a possible implementation, modulation depths of the first heartbeat signal and the second heartbeat signal are smaller than a preset threshold. In this way, service transmission is not affected, and an optical signal to noise ratio of a system is not reduced.

In a possible implementation, carrier signals of the first heartbeat signal and the second heartbeat signal are modulated by means of total optical power. In this way, service bandwidth is not occupied.

According to a third aspect, a network management system is provided, including: a transceiver module, configured to receive first detection information from a first device during a first preset time, and receive second detection information from a second device during a second preset time, where the second detection information is used to indicate whether the second device receives a first heartbeat signal from the first device through a submarine cable, and the first detection information is used to indicate whether the first device receives a second heartbeat signal from the second device through the submarine cable; and a processing module, configured to determine, based on the first detection information and the second detection information that are received by the transceiver module, whether a fault occurs to the submarine cable between the first device and the second device.

In a possible implementation, the processing module is specifically configured to: determine that a fault occurs to the submarine cable in a transmission direction from the second device to the first device if the first detection information indicates that the first device does not receive the second heartbeat signal from the second device through the submarine cable; and determine that no fault occurs to the submarine cable in the transmission direction from the second device to the first device if the first detection information indicates that the first device receives the second heartbeat signal from the second device through the submarine cable.

In a possible implementation, the processing module is specifically configured to: determine that a fault occurs to the submarine cable in a transmission direction from the first device to the second device if the second detection information indicates that the second device does not receive the first heartbeat signal from the first device through the submarine cable; and determine that no fault occurs to the submarine cable in the transmission direction from the first device to the second device if the second detection information indicates that the second device receives the first heartbeat signal from the first device through the submarine cable.

In a possible implementation, the processing module is further configured to detect, before the first detection information is received from the first device during the first preset time and the second detection information is received from the second device during the second preset time, that no fault occurs to the first device and the second device.

In a possible implementation, the transceiver module is further configured to receive second indication information before receiving the first detection information from the first device during the first preset time, where the second indication information is used to indicate that the second device successfully sends the second heartbeat signal; and the transceiver module is further configured to receive first indication information before receiving the second detection information from the second device during the second preset time, where the first indication information is used to indicate that the first device successfully sends the first heartbeat signal.

In a possible implementation, the transceiver module is further configured to: receive third detection information from the first device during a third preset time before the processing module determines that a fault occurs to the submarine cable in the transmission direction from the second device to the first device, where the third detection information is used to indicate whether the first device receives a fourth heartbeat signal from the second device through the submarine cable.

In a possible implementation, the transceiver module is further configured to: receive fourth detection information from the second device during a fourth preset time before the processing module determines that a fault occurs to the submarine cable in the transmission direction from the first device to the second device, where the fourth detection information is used to indicate whether the second device receives a third heartbeat signal from the first device through the submarine cable.

In a possible implementation, modulation frequencies of the first heartbeat signal and the second heartbeat signal are higher than a cut-off frequency of an erbium doped fiber amplifier EDFA.

In a possible implementation, modulation depths of the first heartbeat signal and the second heartbeat signal are smaller than a preset threshold.

In a possible implementation, carrier signals of the first heartbeat signal and the second heartbeat signal are modulated by means of total optical power.

According to a fourth aspect, a first device is provided, including: a transceiver module, configured to send a first heartbeat signal to a second device through a submarine cable, where the first heartbeat signal is used to determine whether a fault occurs to the submarine cable in a transmission direction from the first device to the second device; and a processing module, configured to determine first detection information based on whether the transceiver module receives a second heartbeat signal from the second device during a first preset time through the submarine cable, where the first detection information is used to indicate whether the first device receives the second heartbeat signal from the second device through the submarine cable, where the transceiver module is further configured to send the first detection information to a network management system.

In a possible implementation, the transceiver module is further configured to: send first indication information to the network management system, where the first indication information is used to indicate that the first device successfully sends the first heartbeat signal.

In a possible implementation, the transceiver module is further configured to send a third heartbeat signal to the second device, where the third heartbeat signal is used to determine whether a fault occurs to the submarine cable in the transmission direction from the first device to the second device.

In a possible implementation, the processing module is further configured to determine second detection information based on whether a fourth heartbeat signal from the second device is received during a second preset time through the submarine cable, where the second detection information is used to indicate whether the first device receives the fourth heartbeat signal from the second device through the submarine cable; and the transceiver module is further configured to send the second detection information to the network management system.

In a possible implementation, modulation frequencies of the first heartbeat signal and the second heartbeat signal are higher than a cut-off frequency of an erbium doped fiber amplifier EDFA.

In a possible implementation, modulation depths of the first heartbeat signal and the second heartbeat signal are smaller than a preset threshold.

In a possible implementation, carrier signals of the first heartbeat signal and the second heartbeat signal are modulated by means of total optical power.

According to a fifth aspect, a communication apparatus is provided, including a processor and a memory, where the memory is configured to store a program, and the processor invokes the program stored by the memory, to implement the submarine cable fault determining method according to the first aspect and any implementation of the first aspect.

According to a sixth aspect, a communication apparatus is provided, including a processor and a memory, where the memory is configured to store a program, and the processor invokes the program stored by the memory, to implement the submarine cable fault determining method according to the second aspect and any implementation of the second aspect.

According to a seventh aspect, a computer-readable storage medium is provided, where the computer-readable storage medium stores an instruction, and when the instruction runs on a computer or a processor, the computer or the processor is enabled to implement the submarine cable fault determining method according to the first aspect, the second aspect, and any possible implementation of the first aspect and the second aspect.

According to an eighth aspect, a computer program product containing an instruction is provided, where when the instruction runs on a computer or a processor, the computer or the processor is enabled to implement the submarine cable fault determining method according to the first aspect, the second aspect, and any possible implementation of the first aspect and the second aspect.

According to a ninth aspect, a communication system is provided, including the network management system according to the third aspect and at least two first devices according to the fourth aspect, or including the communication apparatus according to the fifth aspect and at least two communication apparatuses according to the sixth aspect.

For technical effects of the third aspect to the ninth aspect, reference may be made to content of all possible implementations of the first aspect and the second aspect.

DETAILED DESCRIPTION OF THE EMBODIMENTS

Figure 1:
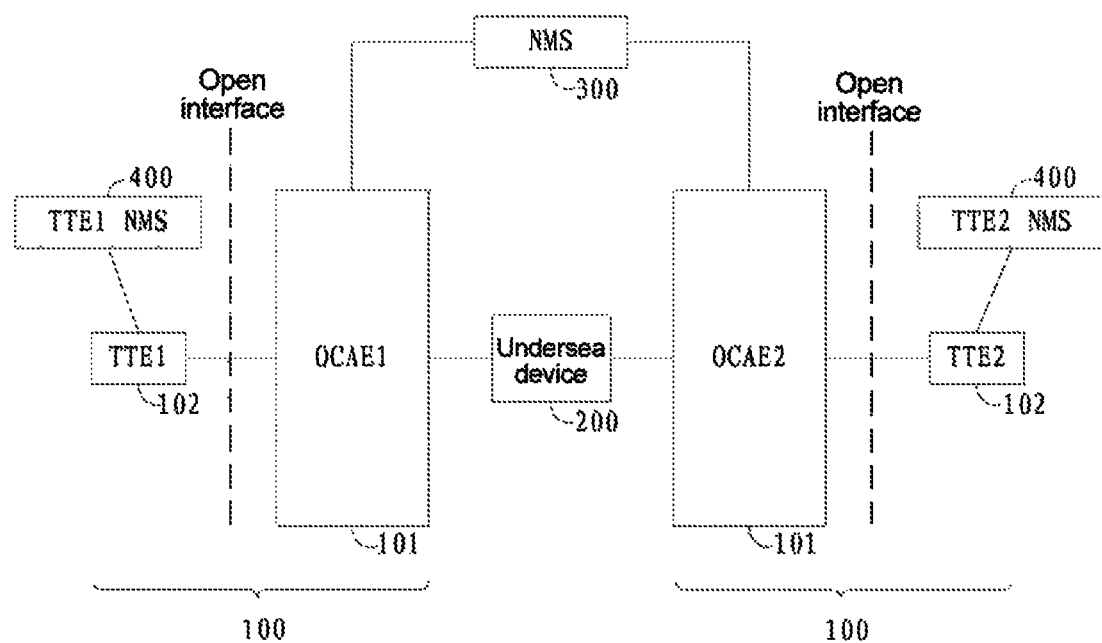
FIG. 1 is a schematic architectural diagram of an open cable communication system according to an embodiment of this application.
Figure 2:
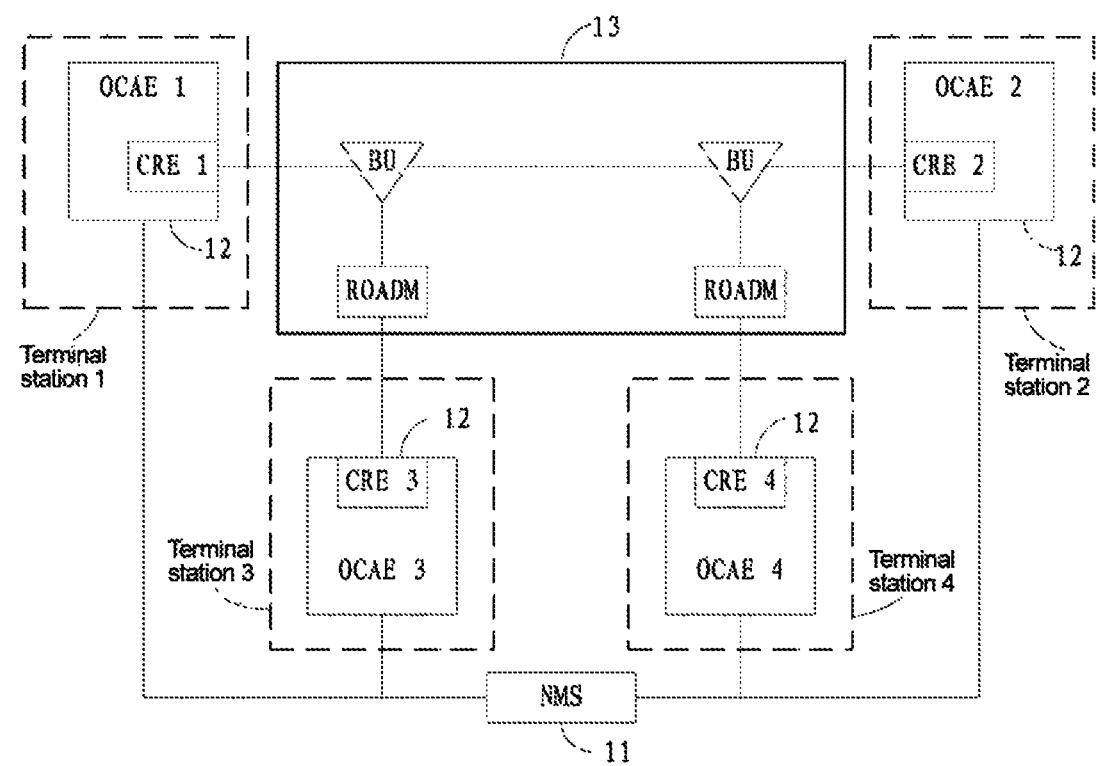
FIG. 2 is a schematic architectural diagram of a communication system according to an embodiment of this application.

As shown in FIG. 2, the communication system provided in embodiments of this application includes a network management system (NMS) 11 and at least two open cable access systems (open cable access equipments, OCAE) 12. Optionally, the system further includes an undersea device 13.

The undersea device 13 includes a submarine cable, an optical amplifier, a branching unit (BU), a reconfigurable optical add-drop multiplexer (ROADM), and the like. In this application, the undersea device 13 is not required to have an intelligent monitoring function of monitoring the submarine cable fault.

The OCAE 12 includes command response equipments (CREs). The CREs send heartbeat signals to each other and detect the heartbeat signal from the opposite terminal. Different OCAEs 12 may be located in different terminal stations (for example, terminal stations 1 to 4).

The NMS may connect and manage all terminal stations through a data communication network (DCN). Communication manners include: Huawei embedded control channel (HWECC) and the like in the band; and virtual private network (VNP), satellite communication, and the like out of the band. OCAEs of all terminal stations are connected to a unitized NMS. The NMS may further collect detection results of all CREs on the heartbeat signal by using the OCAEs, and comprehensively analyze according to a topology structure of the submarine cable, to determine whether a fault occurs and a span of the fault. Further, because the CRE detects in a real time manner, the NMS may also communication with the CRE in a real time manner. In this case, the NMS may quickly determine whether a fault occurs and a span of the fault.

Figure 3:
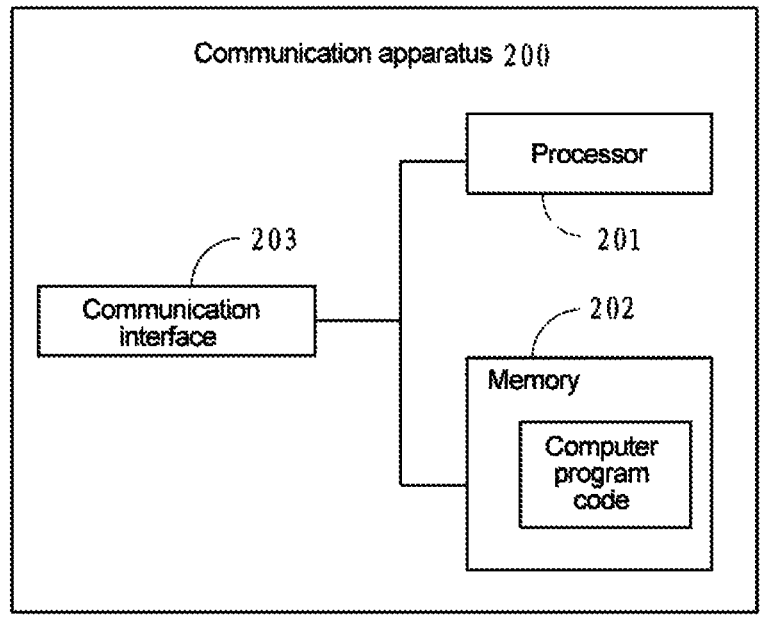
FIG. 3 is a schematic structural diagram of a communication apparatus according to an embodiment of this application.

The NMS 11 and the OCAE 12 together may be referred to as a communication apparatus. For example, as shown in FIG. 3, an embodiment of this application provides a schematic structural diagram of a communication apparatus. A communication apparatus 200 includes: at least one processor 201, at least one memory 202, and at least one communication interface 203. The at least one processor 201, the at least one memory 202, and the at least one communication interface 203 may be connected by using a bus.

The memory 202 is configured to store computer program codes.

The processor 201 is configured to invoke the computer program codes stored by the memory 202, to implement functions of a first device, a second device, or a network management system described in the following method embodiments.

The communication interface 203 is configured to communicate with other communication apparatuses. The communication interface 203 may communication by means of fiber optic communications.

Figure 4:
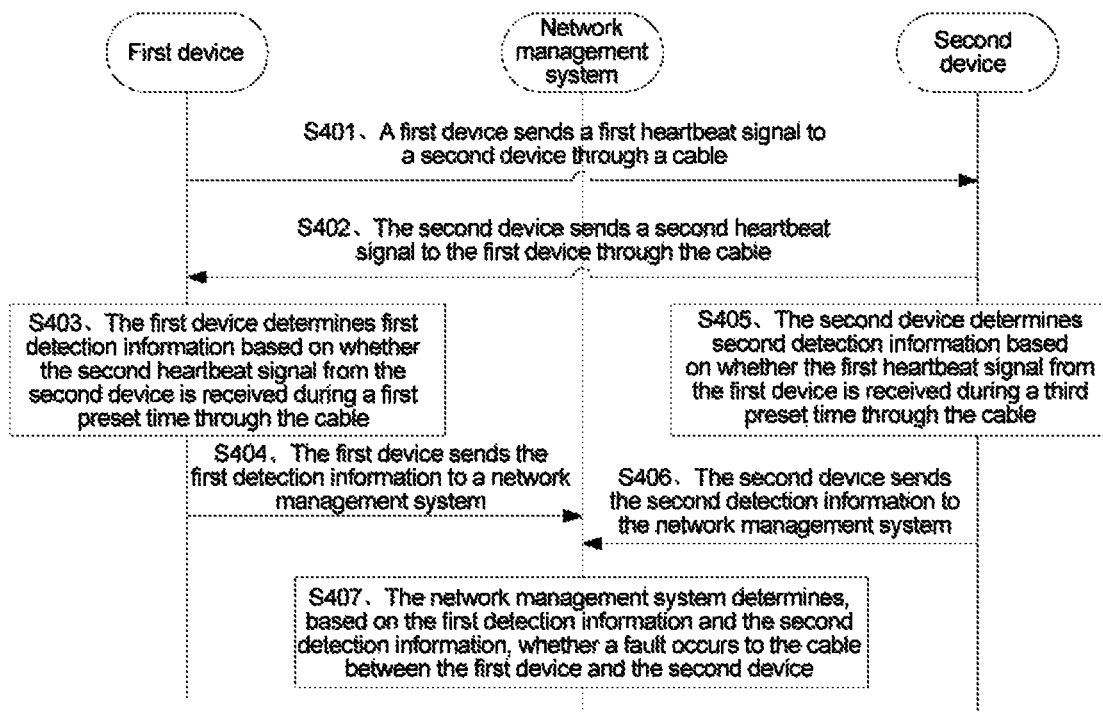
FIG. 4 is a schematic flowchart of a submarine cable fault determining method according to an embodiment of this application.

As shown in FIG. 4, this application provides a submarine cable fault determining method that is applied to the foregoing system. The method includes the following steps.

S401. A first device sends a first heartbeat signal to a second device through a submarine cable.

Correspondingly, the second device receives the first heartbeat signal from the first device through the submarine cable. The first heartbeat signal is used to determine whether a fault occurs to the submarine cable in a transmission direction from the first device to the second device.

The first device and the second device may be the OCAEs 12 described above, and further, may be the CREs described above.

Optionally, after sending the first heartbeat signal to the second device through the submarine cable, the first device may send first indication information to a network management system. The first indication information is used to indicate that the first device successfully sends the first heartbeat signal. For example, the first indication information may be transmitted through a done event. The done event indicates that an action is done, such as a command is sent or a signal from an opposite terminal is received, and the like, and is reported to the network management system by network elements.

S402. The second device sends a second heartbeat signal to the first device through the submarine cable.

Correspondingly, the first device receives the second heartbeat signal from the second device through the submarine cable. The second heartbeat signal is used to determine whether a fault occurs to the submarine cable in a transmission direction from the second device to the first device.

Optionally, after sending the second heartbeat signal to the first device through the submarine cable, the second device may send second indication information to the network management system. The second indication information is used to indicate that the second device successfully sends the second heartbeat signal. For example, the second indication information may be transmitted through a done event.

The heartbeat signals described in the embodiments of this application may refer to particular signals that are periodically sent, such as contiguous bit 1 with a particular length, periodical signals of 0 and 1 with particular lengths; this is not defined in this application.

The first heartbeat signal and the second heartbeat signal may satisfy at least one of the following conditions:

Modulation frequencies of the first heartbeat signal and the second heartbeat signal are higher than a cut-off frequency of an erbium doped fiber amplifier EDFA. In this way, the EDFA may be enabled to have little or no attenuation to the heartbeat signal.

Modulation depths of the first heartbeat signal and the second heartbeat signal are smaller than a preset threshold, for example, are smaller by 5%. In this way, service transmission is not affected, and an optical signal to noise ratio (OSNR) of a system is not reduced.

Carrier signals of the first heartbeat signal and the second heartbeat signal are modulated by means of total optical power amplitude modulation. The modulation manner of optical power may occupy no service bandwidth.

It should be noted that the first heartbeat signal and the second heartbeat signal may be transmitted in a same optical fiber or may be transmitted in different optical fibers; this is not defined in this application.

S403. The first device determines first detection information based on whether the second heartbeat signal from the second device is received during a first preset time through the submarine cable.

The first detection information is used to indicate whether the first device receives the second heartbeat signal from the second device through the submarine cable.

The first preset time may be a preset time after the first device sends the first heartbeat signal.

S404. The first device sends the first detection information to a network management system.

Correspondingly, the network management system receives the first detection information from the first device during a second preset time.

The second preset time may be a preset time after the network management system receives the first detection information at a previous time.

It should be noted that before the network management system receives the first detection information from the first device during the second preset time, the network management system may detect whether a fault occurs to the first device. Otherwise, if a fault occurs to the first device, the first detection information fed back by the first device may be inaccurate, or the network management system cannot receive the first detection information from the first device during the second preset time.

Manners for the network management system to detect whether a fault occurs to the first device may include: actively reporting a fault alarm to the network management system when a fault occurs to the first device, and subsequently detecting whether a fault occurs to the first device by querying stored fault alarms of devices after the network management system stores the fault alarm; or actively querying, by the network management system to the first device, whether there is a fault alarm, to detect whether a fault occurs to the first device.

Optionally, before the network management system receives the first detection information from the first device during the second preset time, the network management system may receive the second indication information from the second device.

When the first device is the CRE described above, the first device may directly send the first detection information to the network management system, or the OCAE collects the first detection information during a time period, and the first detection information is sent to the network management system by using the OCAE; this is not defined in this application.

S405. The second device determines second detection information based on whether the first heartbeat signal from the first device is received during a third preset time through the submarine cable.

The second detection information is used to indicate whether the second device receives the first heartbeat signal from the first device through a submarine cable.

The third preset time may be a preset time after the second device sends the second heartbeat signal.

S406. The second device sends the second detection information to the network management system.

Correspondingly, the network management system receives the second detection information from the second device during a fourth preset time.

It should be noted that before the network management system receives the second detection information from the second device during the fourth preset time, the network management system may detect whether a fault occurs to the second device. Otherwise, if a fault occurs to the second device, the second detection information fed back by the second device may be inaccurate, or the network management system cannot receive the second detection information from the second device during the fourth preset time.

Manners for the network management system to detect whether a fault occurs to the second device may include: actively reporting a fault alarm to the network management system when a fault occurs to the second device, and subsequently detecting whether a fault occurs to the second device by querying stored fault alarms of devices after the network management system stores the fault alarm; or actively querying, by the network management system to the second device, whether there is a fault alarm, to detect whether a fault occurs to the second device.

Optionally, before the network management system receives the second detection information from the second device during the fourth preset time, the network management system may receive the first indication information from the first device.

When the second device is the CRE described above, the second device may directly send the second detection information to the network management system, or the OCAE collects the second detection information during a time period, and the second detection information is sent to the network management system by using the OCAE; this is not defined in this application.

S407. The network management system determines, based on the first detection information and the second detection information, whether a fault occurs to the submarine cable between the first device and the second device.

Fiber optic communications is bidirectional communications using a fiber pair. Although independent fibers are used to transmit and receive, if one fiber in a fiber pair has a problem, the bidirectional communications of transmitting and receiving may be interrupted. The network management system may comprehensively analyze according to a topology structure of the submarine cable and in combination with the first detection information and the second detection information, to determine whether a fault occurs to the submarine cable between the first device and the second device.

Specifically, if the first detection information indicates that the first device does not receive the second heartbeat signal from the second device through the submarine cable, the network management system determines that a fault occurs to the submarine cable in the transmission direction from the second device to the first device. If the first detection information indicates that the first device receives the second heartbeat signal from the second device through the submarine cable, the network management system determines that no fault occurs to the submarine cable in the transmission direction from the second device to the first device.

If the second detection information indicates that the second device does not receive the first heartbeat signal from the first device through the submarine cable, the network management system determines that a fault occurs to the submarine cable in the transmission direction from the first device to the second device. If the second detection information indicates that the second device receives the first heartbeat signal from the first device through the submarine cable, the network management system determines that no fault occurs to the submarine cable in the transmission direction from the first device to the second device.

Further, to improve determining accuracy, a transmit end may repeatedly send the heartbeat signals for N times, and for each heartbeat signal, a receive end may send detection information to a network device. Therefore, totally N pieces of detection information are sent. Only if all the N pieces of detection information indicate that the receive end does not receive the heartbeat signal, the network management system determines that a fault occurs to a submarine cable in a transmission direction from the transmit end to the receive end. If at least one of the N pieces of detection information indicates that the receive end receives the heartbeat signal, the network management system may determine that no fault occurs to the submarine cable in the transmission direction from the transmit end to the receive end. For example, N may be 3.

It should be noted that the transmit end may be instructed by the network management system to repeatedly send the heartbeat signal, or the transmit end may initiatively and repeatedly send the heartbeat signal.

For example, if the first device does not receive the second heartbeat signal that is from the second device during the first preset time through the submarine cable, the first device sends a third heartbeat signal to the second device. The third heartbeat signal is sued to determine whether a fault occurs to the submarine cable in the transmission direction from the first device to the second device. The first device determines fourth detection information based on whether the third heartbeat signal from the first device is received during a sixth preset time through the submarine cable. The fourth detection information is used to indicate whether the first device receives a fourth heartbeat signal from the second device through the submarine cable. The first device sends the fourth detection information to the network management system.

If the second device does not receive the first heartbeat signal that is from the first device during the second preset time through the submarine cable, the second device sends the fourth heartbeat signal to the first device. The fourth heartbeat signal is sued to determine whether a fault occurs to the submarine cable in the transmission direction from the second device to the first device. The first device determines third detection information based on whether the fourth heartbeat signal from the second device is received during a fifth preset time through the submarine cable. The third detection information is used to indicate whether the first device receives the fourth heartbeat signal from the second device through the submarine cable. The first device sends the third detection information to the network management system.

Before the network management system determines that a fault occurs to the submarine cable in the transmission direction from the second device to the first device, the network management system receives the third detection information from the first device during a seventh preset time. The third detection information is used to indicate whether the first device receives the fourth heartbeat signal from the second device through the submarine cable.

Before the network management system determines that a fault occurs to the submarine cable in the transmission direction from the first device to the second device, the network management system receives the fourth detection information from the second device during an eighth preset time. The fourth detection information is used to indicate whether the second device receives the third heartbeat signal from the first device through the submarine cable.

It should be noted that it is not defined in this application that there are only the two devices described above, and it is also not defined that merely whether a fault occurs to a submarine cable between the two devices is determined. When there are more than two devices, an intersection of the detection information may be taken, so as to determine whether a fault occurs to a submarine cable in a span between the devices.

Figure 5:
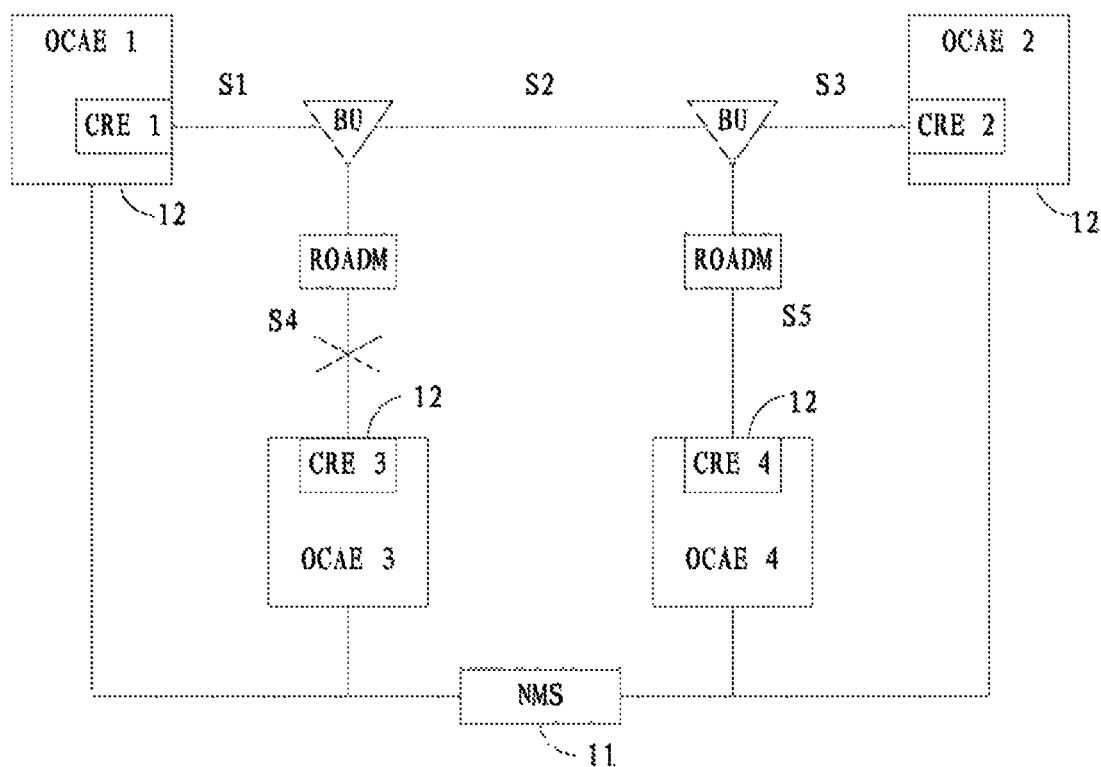
FIG. 5 is a schematic diagram I of an example of a submarine cable fault according to an embodiment of this application.

For example, as shown in FIG. 5, it is assumed that there are totally five spans S1 to S5 among four terminal stations. Table 1 displays detection information I that is received from devices by the network management system.

TABLE 1

| Transmit end | Received end | | | |
|---|---|---|---|---|
| | CRE 1 | CRE 2 | CRE 3 | CRE 4 |
| CRE 1 | | Y | N | Y |
| CRE 2 | Y | | N | Y |
| CRE 3 | N | N | | N |
| CRE 4 | Y | Y | N | |

The transmit end shown in table 1 refers to an end transmitting a heartbeat signal, the receive end refers to an end receiving the heartbeat signal, Y represents that the detection information is that the receive end receives the heartbeat signal from the transmit end through a submarine cable, and N represents that the detection information is that the receive end does not receive the heartbeat signal from the transmit end through the submarine cable. For example, using data in the first column as an example, if CRE 1 is a transmit end and respectively sends heartbeat signals to CREs 2-4, CRE 2 and CRE 4 receive the heartbeat signals sent by the CRE 1, and CRE 3 does not receive the heartbeat signal sent by the CRE 1.

It may be learned from the content shown in table 1 that heartbeat signals sent to each other by the CRE 1 and the CRE 2 may be received by the other party. Therefore, no fault occurs to a submarine cable (spans S1-S3) between the CRE 1 and the CRE 2. Similarly, heartbeat signals sent to each other by the CRE 1 and the CRE 4 and by the CRE 2 and the CRE 4 may be received by the other party. Therefore, no fault occurs to a submarine cable (spans S1, S2, and S5) between the CRE 1 and the CRE 4, and no fault occurs to a submarine cable (spans S3 and S5) between the CRE 2 and the CRE 4 either. Moreover, as a receive end, CRE 3 does not receive the heartbeat signal from another CRE. CRE 3 serves as a transmit end, and the other CREs also do not receive the heartbeat signal sent by the CRE 3. Therefore, it may be determined that a fault occurs to a submarine cable in span S4.

Figure 6:
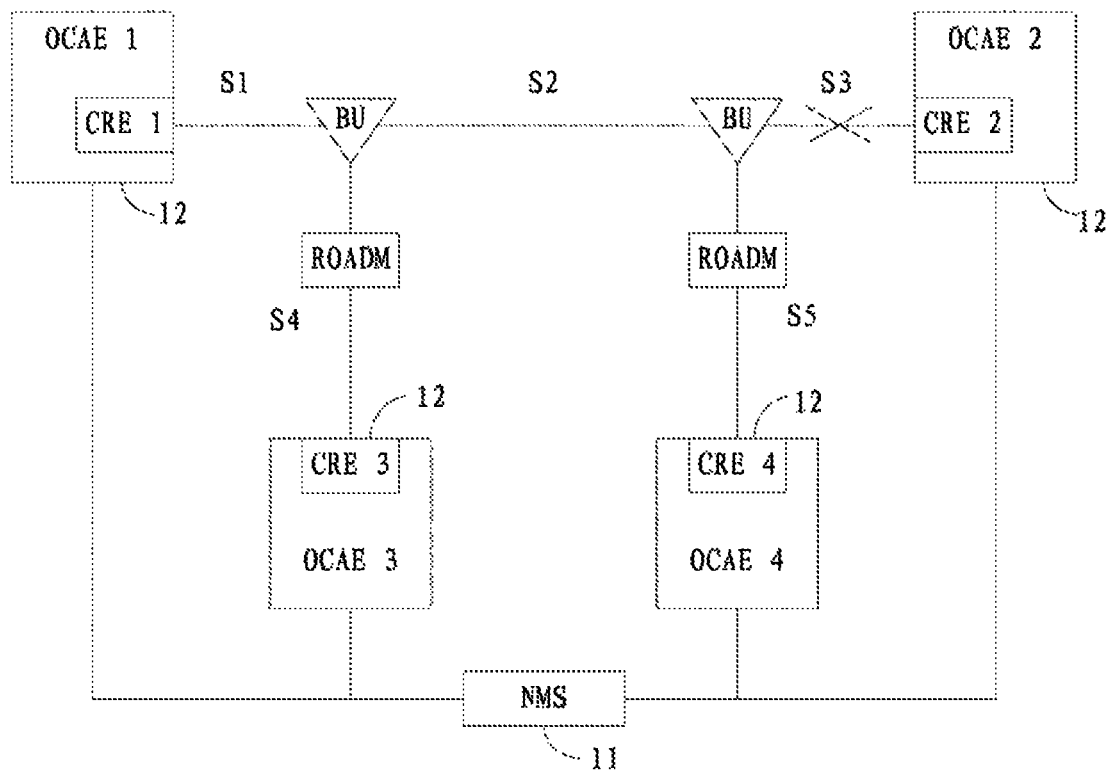
FIG. 6 is a schematic diagram II of an example of a submarine cable fault according to an embodiment of this application.

For example, as shown in FIG. 6, it is assumed that there are totally five spans S1 to S5 among four terminal stations. Table 2 displays detection information II that is received from devices by the network management system.

TABLE 2

| Transmit end | Receive end | | | |
| --- | --- | --- | --- | --- |
| | CRE 1 | CRE 2 | CRE 3 | CRE 4 |
| CRE 1 | | N | Y | Y |
| CRE 2 | N | | N | N |
| CRE 3 | Y | N | | Y |
| CRE 4 | Y | N | Y | |

The transmit end shown in table 2 refers to an end transmitting a heartbeat signal, the receive end refers to an end receiving the heartbeat signal, Y represents that the detection information is that the receive end receives the heartbeat signal from the transmit end through a submarine cable, and N represents that the detection information is that the receive end does not receive the heartbeat signal from the transmit end through the submarine cable. For example, using data in the first column as an example, if CRE 1 is a transmit end and respectively sends heartbeat signals to CREs 2-4, CRE 3 and CRE 4 receive the heartbeat signals sent by the CRE 1, and CRE 2 does not receive the heartbeat signal sent by the CRE 1.

It may be learned from the content shown in table 2 that heartbeat signals sent to each other by the CRE 1 and the CRE 3 may be received by the other party. Therefore, no fault occurs to a submarine cable (spans S1 and S4) between the CRE 1 and the CRE 3. Similarly, heartbeat signals sent to each other by the CRE 1 and the CRE 4 and by the CRE 3 and the CRE 4 may be received by the other party. Therefore, no fault occurs to a submarine cable (spans S1, S2, and S5) between the CRE 1 and the CRE 4, and no fault occurs to a submarine cable (spans S2, S4, and S5) between the CRE 3 and the CRE 4 either. Moreover, as a receive end, CRE 2 does not receive the heartbeat signal from another CRE. CRE 2 serves as a transmit end, and the other CREs also do not receive the heartbeat signal sent by the CRE 2. Therefore, it may be determined that a fault occurs to a submarine cable in span S3.

According to the submarine cable fault determining method provided in the embodiments of this application, devices communicate through a submarine cable send heartbeat signals to each other, and the network management system collects results about whether each device receives the heartbeat signal from an opposite terminal, so as to determine that a fault occurs to the submarine cable between which two devices, thus realizing detecting whether a fault occurs to the submarine cable, without depending on TTE.

It may be understood that in the foregoing embodiments, the methods and/or steps implemented by the network management system may also be implemented by components (such as a chip or a circuit) that are applied to the network management system, and the methods and/or steps implemented by the network device may also be implemented by components applied to the network device.

The solutions provided in the embodiments of this application are mainly described above from a perspective of interaction between various network elements. Correspondingly, an embodiment of this application further provides a communication apparatus. The communication apparatus is configured to implement the foregoing methods. The communication apparatus may be the network management system in the foregoing method embodiments, or may be a device including the foregoing network management system, or may be a component applied to the foregoing network management system. It may be understood that to implement the foregoing functions, the communication apparatus includes corresponding hardware structures and/or software modules for performing the functions. A person skilled in the art should be easily aware that units and algorithm steps in the examples described with reference to the embodiments disclosed in this specification may be implemented in a form of hardware or a combination of hardware and computer software. Whether a function is performed by hardware or hardware driven by computer software depends on particular applications and design constraints of the technical solutions. For each particular application, a person skilled in the art may use different methods to implement the described functions, but it should not be considered that this implementation goes beyond the scope of this application.

In the embodiments of this application, function modules of the communication apparatus may be divided according to the foregoing method embodiments. For example, each function module may be divided in correspondence with each function, or at least two functions may be integrated into one processing module. The foregoing integrated module may be implemented in a form of hardware, or may be implemented in a form of a software function module. It should be noted that the module division in the embodiments of this application is an example and is merely logical function division. There may be other division manners in actual implementations.

Figure 7:
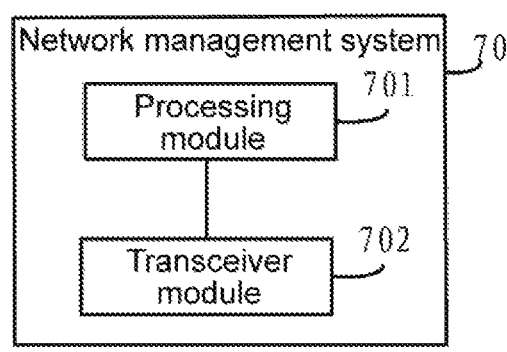
FIG. 7 is a schematic structural diagram of a network management system according to an embodiment of this application.

For example, the communication apparatus being the network management system in the foregoing method embodiments is used as an example. FIG. 7 shows a schematic structural diagram of a network management system 70. The network management system 70 includes a processing module 701 and a transceiver module 702. The transceiver module 702 may also be referred to as a transceiver unit, and is configured to achieve a sending and/or receiving function, for example, may be a transceiver circuit, a transceiving machine, a transceiver, or a communication interface.

The transceiver module 702 is configured to receive first detection information from a first device during a first preset time, and receive second detection information from a second device during a second preset time, where the second detection information is used to indicate whether the second device receives a first heartbeat signal from the first device through a submarine cable, and the first detection information is used to indicate whether the first device receives a second heartbeat signal from the second device through the submarine cable.

The processing module 701 is configured to determine, based on the first detection information and the second detection information that are received by the transceiver module 702, whether a fault occurs to the submarine cable between the first device and the second device.

Optionally, the processing module 701 is specifically configured to:

determine that a fault occurs to the submarine cable in a transmission direction from the second device to the first device if the first detection information indicates that the first device does not receive the second heartbeat signal from the second device through the submarine cable; and determine that no fault occurs to the submarine cable in the transmission direction from the second device to the first device if the first detection information indicates that the first device receives the second heartbeat signal from the second device through the submarine cable.

Optionally, the processing module 701 is specifically configured to:

determine that a fault occurs to the submarine cable in a transmission direction from the first device to the second device if the second detection information indicates that the second device does not receive the first heartbeat signal from the first device through the submarine cable; and determine that no fault occurs to the submarine cable in the transmission direction from the first device to the second device if the second detection information indicates that the second device receives the first heartbeat signal from the first device through the submarine cable.

Optionally, the processing module 701 is further configured to detect, before the transceiver module 702 receives the first detection information from the first device during the first preset time and receives the second detection information from the second device during the second preset time, that no fault occurs to the first device and the second device.

Optionally, the transceiver module 702 is further configured to receive second indication information before receiving the first detection information from the first device during the first preset time, where the second indication information is used to indicate that the second device successfully sends the second heartbeat signal. The transceiver module 702 is further configured to receive first indication information before receiving the second detection information from the second device during the second preset time, where the first indication information is used to indicate that the first device successfully sends the first heartbeat signal.

Optionally, the transceiver module 702 is further configured to: receive third detection information from the first device during a third preset time before the processing module 701 determines that a fault occurs to the submarine cable in the transmission direction from the second device to the first device, where the third detection information is used to indicate whether the first device receives a fourth heartbeat signal from the second device through the submarine cable.

Optionally, the transceiver module 702 is further configured to: receive fourth detection information from the second device during a fourth preset time before the processing module 701 determines that a fault occurs to the submarine cable in the transmission direction from the first device to the second device, where the fourth detection information is used to indicate whether the second device receives a third heartbeat signal from the first device through the submarine cable.

Optionally, modulation frequencies of the first heartbeat signal and the second heartbeat signal are higher than a cut-off frequency of an erbium doped fiber amplifier EDFA.

Optionally, modulation depths of the first heartbeat signal and the second heartbeat signal are smaller than a preset threshold.

Optionally, carrier signals of the first heartbeat signal and the second heartbeat signal are modulated by means of total optical power.

All relevant content of the steps involved in the foregoing method embodiments may be cited in the descriptions about functions of the corresponding function modules or the descriptions about the foregoing method, and details are not described herein again.

In the embodiments of this application, the network management system 70 is presented by means of dividing all function modules in an integrated manner. The "module" herein may refer to a particular ASIC, a circuit, a processor and a memory that execute one or more software or firmware programs, an integrated logic circuit, and/or another component that can provide the foregoing function. In a simple embodiment, a person skilled in the art may conceive that the network management system 70 may be in the form of the communication apparatus 200 shown in FIG. 3.

For example, the processor 201 in the communication apparatus 200 shown in FIG. 3 may invoke a computer execution instruction stored in the memory 202 to enable the communication apparatus 200 to perform the submarine cable fault determining method in the foregoing method embodiments.

Specifically, functions/implementation processes of the processing module 701 and the transceiver module 702 in FIG. 7 may be implemented by means that the processor 201 in the communication apparatus 200 shown in FIG. 3 invokes the computer execution instruction stored in the memory 202. Alternatively, the functions/implementation processes of the processing module 701 in FIG. 7 may be implemented by means that the processor 201 in the communication apparatus 200 shown in FIG. 3 invokes the computer execution instruction stored in the memory 202, and the functions/implementation processes of the transceiver module 702 in FIG. 7 may be implemented by using the communication interface 203 in the communication apparatus 200 shown in FIG. 3.

The communication apparatus 200 provided in the embodiments of this application may perform the foregoing submarine cable fault determining method. Therefore, for technical effects that may be obtained by the communication apparatus 200, reference may be made to the foregoing method embodiments, and details are not described herein again.

Figure 8:
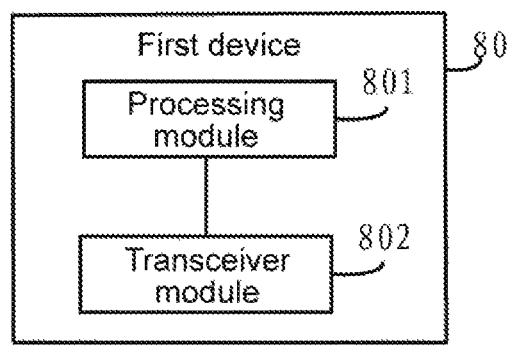
FIG. 8 is a schematic structural diagram of a first device or a second device according to an embodiment of this application.

Alternatively, for example, the communication apparatus being the first device or the second device in the foregoing method embodiments is used as an example. FIG. 8 shows a schematic structural diagram of a first device 80. The first device 80 includes a processing module 801 and a transceiver module 802. The transceiver module 802 may also be referred to as a transceiver unit, and is configured to achieve a sending and/or receiving function, for example, may be a transceiver circuit, a transceiving machine, a transceiver, or a communication interface.

The transceiver module 802 is configured to send a first heartbeat signal to a second device through a submarine cable, where the first heartbeat signal is sued to determine whether a fault occurs to the submarine cable in a transmission direction from the first device to the second device.

The processing module 801 is configured to determine detection information based on whether the transceiver module receives a second heartbeat signal from the second device through the submarine cable, where the detection information is used to indicate whether the first device receives the second heartbeat signal from the second device through the submarine cable.

The transceiver module 802 is further configured to send the detection information to a network management system.

Optionally, the transceiver module 802 is further configured to: send first indication information to the network management system, where the first indication information is used to indicate that the first device successfully sends the first heartbeat signal.

Optionally, the transceiver module 802 is further configured to send a third heartbeat signal to the second device, where the third heartbeat signal is sued to determine whether a fault occurs to the submarine cable in the transmission direction from the first device to the second device.

Optionally, the processing module 801 is further configured to determine second detection information based on whether a fourth heartbeat signal from the second device is received during a second preset time through the submarine cable, where the second detection information is used to indicate whether the first device receives the fourth heartbeat signal from the second device through the submarine cable. The transceiver module 802 is further configured to send the second detection information to the network management system.

Optionally, modulation frequencies of the first heartbeat signal and the second heartbeat signal are higher than a cut-off frequency of an erbium doped fiber amplifier EDFA.

Optionally, modulation depths of the first heartbeat signal and the second heartbeat signal are smaller than a preset threshold.

Optionally, carrier signals of the first heartbeat signal and the second heartbeat signal are modulated by means of total optical power.

All relevant content of the steps involved in the foregoing method embodiments may be cited in the descriptions about functions of the corresponding function modules or the descriptions about the foregoing method, and details are not described herein again.

In the embodiments of this application, the first device 80 is presented by means of dividing all function modules in an integrated manner. The "module" herein may refer to a particular ASIC, a circuit, a processor and a memory that execute one or more software or firmware programs, an integrated logic circuit, and/or another component that can provide the foregoing function. In a simple embodiment, a person skilled in the art may conceive that the first device 80 may be in the form of the communication apparatus 200 shown in FIG. 3.

For example, the processor 201 in the communication apparatus 200 shown in FIG. 3 may invoke a computer execution instruction stored in the memory 202 to enable the communication apparatus 200 to perform the submarine cable fault determining method in the foregoing method embodiments.

Specifically, functions/implementation processes of the processing module 801 and the transceiver module 802 in FIG. 8 may be implemented by means that the processor 201 in the communication apparatus 200 shown in FIG. 3 invokes the computer execution instruction stored in the memory 202. Alternatively, the functions/implementation processes of the processing module 801 in FIG. 8 may be implemented by means that the processor 201 in the communication apparatus 200 shown in FIG. 3 invokes the computer execution instruction stored in the memory 202, and the functions/implementation processes of the transceiver module 802 in FIG. 8 may be implemented by using the communication interface 203 in the communication apparatus 200 shown in FIG. 3.

The communication apparatus 200 provided in the embodiments of this application may perform the foregoing submarine cable fault determining method. Therefore, for technical effects that may be obtained by the communication apparatus 200, reference may be made to the foregoing method embodiments, and details are not described herein again.

An embodiment of this application further provides a communication apparatus, including a processor and a memory. The memory is configured to store a program, and the processor invokes the program stored by the memory, to enable the communication apparatus to implement the submarine cable fault determining method of the network management system in FIG. 4.

An embodiment of this application further provides a communication apparatus, including a processor and a memory. The memory is configured to store a program, and the processor invokes the program stored by the memory, to enable the communication apparatus to implement the submarine cable fault determining methods of the first device and the second device in FIG. 4.

An embodiment of this application further provides a computer-readable storage medium. The computer-readable storage medium stores an instruction, and when the instruction runs on a computer or a processor, the computer or the processor is enabled to implement the submarine cable fault determining method of the network management system, the first device, or the second device in FIG. 4.

An embodiment of this application further provides a computer program product containing an instruction, where when the instruction runs on a computer or a processor, the computer or the processor is enabled to implement the submarine cable fault determining method of the network management system, the first device, or the second device in FIG. 4.

An embodiment of this application further provides a chip system, where the chip system includes a processor that is applied to a communication apparatus to implement the submarine cable fault determining method of the network management system in FIG. 4. For example, the network management system receives first detection information from the first device during the first preset time, and receives second detection information from the second device during the second preset time, where the second detection information is used to indicate whether the second device receives the first heartbeat signal from the first device through the submarine cable, and the first detection information is used to indicate whether the first device receives the second heartbeat signal from the second device through the submarine cable; and the network management system determines, based on the first detection information and the second detection information, whether a fault occurs to the submarine cable between the first device and the second device.

In a possible design, the chip system further includes a memory, where the memory is configured to save necessary program instructions and data of the network management system. The chip system may include a chip and an integrated circuit, and may also include a chip and another separate component; this is not specifically defined in the embodiments of this application.

An embodiment of this application further provides a chip system, where the chip system includes a processor that is applied to a communication apparatus to implement the communication method of the first device or the second device in FIG. 4. For example, a first device sends a first heartbeat signal to a second device through a submarine cable, where the first heartbeat signal is sued to determine whether a fault occurs to the submarine cable in a transmission direction from the first device to the second device; the first device determines detection information based on whether a second heartbeat signal from the second device is received through the submarine cable, where the detection information is used to indicate whether the first device receives the second heartbeat signal from the second device through the submarine cable; and the first device sends the detection information to a network management system.

In a possible design, the chip system further includes a memory, where the memory is configured to save necessary program instructions and data of the first device or the second device. The chip system may include a chip and an integrated circuit, and may also include a chip and another separate component; this is not specifically defined in the embodiments of this application.

The communication apparatus, the computer storage medium, the computer program product, and the chip system provided in this application are all configured to the implement the submarine cable fault determining method described above. Therefore, for beneficial effects that can be achieved thereby, reference may be made to the beneficial effects in the implementation provided above, and details are not described herein again.

It should be understood that in various embodiments of this application, a sequence number of each foregoing process does not mean a sequential order for execution. An execution sequence of each process is determined based on functions and internal logic of the program, and should not constitute a limitation on the implementation processes of the embodiments of this application.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. For each particular application, a person skilled in the art may use different methods to implement the described functions, but it should not be considered that this implementation goes beyond the scope of this application.

A person skilled in the art may clearly understand that for ease and simplicity of description, for specific working processes of the foregoing system, device, and unit that are described above, reference may be made to corresponding processes in the foregoing method embodiments, and details are not described herein again.

In the embodiments provided in this application, it should be understood that the disclosed system, device, and method may be implemented in other manners. For example, the device embodiments described above are merely exemplary. For example, the division of units is only a division of logical functions. In actual implementations, there may be other division manners. For example, a plurality of units or components may be combined or integrated into another system, or some features may be ignored or not implemented. In addition, the displayed or discussed mutual coupling or direct coupling or communications connection may be indirect coupling or communication connections through some interfaces, devices, or units, and may be in electrical, mechanical, or other forms.

The units described as separated parts may be or may not be physically separated; and parts displayed as units may be or may not be physical unit, that is, may be located at one place or may be distributed on a plurality of network units. Some or all of the units may be selected according to actual requirements to achieve the objectives of the solutions of the embodiments.

In addition, all functional units in the embodiments of this application may be integrated into one processing unit, or each unit may exist alone physically, or two or more units may be integrated into one unit.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible by the computer, or a data storage device, such as a server or a data center, integrating one or more usable media. The available medium may be a magnetic medium (for example, a floppy disk, a hard disk, or a magnetic tape), an optical medium (for example, a DVD), a semiconductor medium (for example, a solid state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A submarine cable fault determining method, comprising:
   receiving, by a network management system, first detection information from a first device during a first preset time, and receiving second detection information from a second device during a second preset time, wherein the second detection information is used to indicate whether the second device receives a first heartbeat signal from the first device through a submarine cable, and the first detection information is used to indicate whether the first device receives a second heartbeat signal from the second device through the submarine cable; and
   determining, by the network management system based on the first detection information and the second detection information, whether a fault occurs to the submarine cable between the first device and the second device;

wherein:
before the receiving, by a network management system, first detection information from a first device during a first preset time, the method further comprises:
receiving second indication information by the network management system, wherein the second indication information is used to indicate that the second device successfully sends the second heartbeat signal; and
before the receiving second detection information from a second device during a second preset time, the method further comprises:
receiving first indication information by the network management system, wherein the first indication information is used to indicate that the first device successfully sends the first heartbeat signal.

2. The method according to claim 1, wherein the determining, by the network management system based on the first detection information and the second detection information, whether a fault occurs to the submarine cable between the first device and the second device comprises that:
if the first detection information indicates that the first device does not receive the second heartbeat signal from the second device through the submarine cable, the network management system determines that a fault occurs to the submarine cable in a transmission direction from the second device to the first device; and
if the first detection information indicates that the first device receives the second heartbeat signal from the second device through the submarine cable, the network management system determines that no fault occurs to the submarine cable in the transmission direction from the second device to the first device.

3. The method according to claim 1, wherein the determining, by the network management system based on the first detection information and the second detection information, whether a fault occurs to the submarine cable between the first device and the second device comprises that:
if the second detection information indicates that the second device does not receive the first heartbeat signal from the first device through the submarine cable, the network management system determines that a fault occurs to the submarine cable in a transmission direction from the first device to the second device; and
if the second detection information indicates that the second device receives the first heartbeat signal from the first device through the submarine cable, the network management system determines that no fault occurs to the submarine cable in the transmission direction from the first device to the second device.

4. The method according to claim 1, wherein before the receiving, by a network management system, first detection information from a first device during a first preset time, and receiving second detection information from a second device during a second preset time, the method further comprises:
detecting, by the network management system, that no fault occurs to the first device and the second device.

5. The method according to claim 2, wherein before that the network management system determines that a fault occurs to the submarine cable in a transmission direction from the second device to the first device, the method further comprises:
receiving, by the network management system, third detection information from the first device during a third preset time, wherein the third detection information is used to indicate whether the first device receives a fourth heartbeat signal from the second device through the submarine cable.

6. The method according to claim 3, wherein before that the network management system determines that a fault occurs to the submarine cable in a transmission direction from the first device to the second device, the method further comprises:
receiving, by the network management system, fourth detection information from the second device during a fourth preset time, wherein the fourth detection information is used to indicate whether the second device receives a third heartbeat signal from the first device through the submarine cable.

7. The method according to claim 1, wherein modulation frequencies of the first heartbeat signal and the second heartbeat signal are higher than a cut-off frequency of an erbium doped fiber amplifier EDFA.

8. The method according to claim 1, wherein modulation depths of the first heartbeat signal and the second heartbeat signal are smaller than a preset threshold.

9. The method according to claim 1, wherein carrier signals of the first heartbeat signal and the second heartbeat signal are modulated by means of total optical power.

10. A submarine cable fault determining method, comprising:
sending, by a first device, a first heartbeat signal to a second device through a submarine cable, wherein the first heartbeat signal is used to determine whether a fault occurs to the submarine cable in a transmission direction from the first device to the second device;
determining, by the first device, first detection information based on whether a second heartbeat signal from the second device is received during a first preset time through the submarine cable, wherein the first detection information is used to indicate whether the first device receives the second heartbeat signal from the second device through the submarine cable;
sending, by the first device, the first detection information to a network management system; and
sending, by the first device, first indication information to the network management system, wherein the first indication information is used to indicate that the first device successfully sends the first heartbeat signal.

11. The method according to claim 10, wherein the method further comprises:
sending, by the first device, a third heartbeat signal to the second device, wherein the third heartbeat signal is used to determine whether a fault occurs to the submarine cable in the transmission direction from the first device to the second device.

12. The method according to claim 10, wherein the method further comprises:
determining, by the first device, second detection information based on whether a fourth heartbeat signal from the second device is received during a second preset time through the submarine cable, wherein the second detection information is used to indicate whether the first device receives the fourth heartbeat signal from the second device through the submarine cable; and
sending, by the first device, the second detection information to the network management system.

13. The method according to claim 10, wherein modulation frequencies of the first heartbeat signal and the second heartbeat signal are higher than a cut-off frequency of an erbium doped fiber amplifier EDFA.

14. The method according to claim 10, wherein modulation depths of the first heartbeat signal and the second heartbeat signal are smaller than a preset threshold.

15. The method according to claim 10, wherein carrier signals of the first heartbeat signal and the second heartbeat signal are modulated by means of total optical power.

16. A network management system, comprising:
a transceiver module, configured to receive first detection information from a first device during a first preset time, and receive second detection information from a second device during a second preset time, wherein the second detection information is used to indicate whether the second device receives a first heartbeat signal from the first device through a submarine cable, and the first detection information is used to indicate whether the first device receives a second heartbeat signal from the second device through the submarine cable; and
a processing module, configured to determine, based on the first detection information and the second detection information that are received by the transceiver module, whether a fault occurs to the submarine cable between the first device and the second device;
the transceiver module is further configured to receive second indication information before receiving the first detection information from the first device during the first preset time, wherein the second indication information is used to indicate that the second device successfully sends the second heartbeat signal; and
the transceiver module is further configured to receive first indication information before receiving the second detection information from the second device during the second preset time, wherein the first indication information is used to indicate that the first device successfully sends the first heartbeat signal.

17. The network management system according to claim 16, wherein the processing module is specifically configured to:
determine that a fault occurs to the submarine cable in a transmission direction from the second device to the first device if the first detection information indicates that the first device does not receive the second heartbeat signal from the second device through the submarine cable; and
determine that no fault occurs to the submarine cable in the transmission direction from the second device to the first device if the first detection information indicates that the first device receives the second heartbeat signal from the second device through the submarine cable.

18. The network management system according to claim 16, wherein the processing module is specifically configured to:
determine that a fault occurs to the submarine cable in a transmission direction from the first device to the second device if the second detection information indicates that the second device does not receive the first heartbeat signal from the first device through the submarine cable; and
determine that no fault occurs to the submarine cable in the transmission direction from the first device to the second device if the second detection information indicates that the second device receives the first heartbeat signal from the first device through the submarine cable.

19. The network management system according to claim 16, wherein the processing module is further configured to detect, before the transceiver module receives the first detection information from the first device during the first preset time and receives the second detection information from the second device during the second preset time, that no fault occurs to the first device and the second device.

20. The network management system according to claim 17, the transceiver module is further configured to: receive third detection information from the first device during a third preset time before the processing module determines that a fault occurs to the submarine cable in the transmission direction from the second device to the first device, wherein the third detection information is used to indicate whether the first device receives a fourth heartbeat signal from the second device through the submarine cable.

21. The network management system according to claim 18, the transceiver module is further configured to: receive fourth detection information from the second device during a fourth preset time before the processing module determines that a fault occurs to the submarine cable in the transmission direction from the first device to the second device, wherein the fourth detection information is used to indicate whether the second device receives a third heartbeat signal from the first device through the submarine cable.

* * * * *